US006371856B1

United States Patent
Niwa

(10) Patent No.: US 6,371,856 B1
(45) Date of Patent: *Apr. 16, 2002

(54) VIDEO GAME APPARATUS, VIDEO GAME METHOD AND STORAGE MEDIUM

(75) Inventor: Takayuki Niwa, Honolulu, HI (US)

(73) Assignee: Square Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,322

(22) Filed: Mar. 23, 1999

(51) Int. Cl.$^7$ ................................................. A63F 13/00
(52) U.S. Cl. ................................. 463/43; 463/1; 463/7; 463/33
(58) Field of Search ................................. 434/307 R, 308, 434/309; 463/1, 7, 8, 30–36, 40–42; 273/461, 400, 237

(56) References Cited

U.S. PATENT DOCUMENTS

| | | | | |
|---|---|---|---|---|
| RE35,314 E | * | 8/1996 | Logg | 463/2 |
| 5,752,883 A | * | 5/1998 | Butcher et al. | 463/43 |
| 5,954,332 A | * | 9/1999 | Mero | 463/42 |
| 6,024,643 A | * | 2/2000 | Begis | 463/42 |
| 6,106,399 A | * | 8/2000 | Baker et al. | 463/42 |
| 6,123,619 A | * | 9/2000 | Tokita et al. | 463/43 |
| 6,126,544 A | * | 10/2000 | Kojima | 463/31 |
| 6,155,923 A | * | 12/2000 | Stephens et al. | 463/1 |

OTHER PUBLICATIONS

U.S. application No. 09/274,322, filed Mar. 23. 1999, pending.
U.S. application No. 09/274,323, filed Mar. 23, 1999, pending.
U.S. application No. 09/274,925, filed Mar. 23, 1999, pending.
U.S. application No. 09/274,926, filed Mar. 23, 1999, pending.

* cited by examiner

Primary Examiner—Joe H. Cheng
Assistant Examiner—John M Hotaling, II
(74) Attorney, Agent, or Firm—Oblon, Spivak, McClelland, Maier & Neustadt, P.C.

(57) ABSTRACT

A player operates an input device causing a player character to move on a map including a plurality of encountering areas where the player character encounters an enemy character. An encounter setting value set for each one of the encountering areas where the player character encounters the enemy character is stored in a memory. The player character encounters the enemy character in a probability corresponding to the encounter setting value when it steps into an encountering area, and then processing for a battle held between the player character and the enemy character is performed. When the player character wins the battle against the enemy character, the encounter setting value for the area is updated, so that the probability that the player character encounters the enemy character sequentially decreases.

17 Claims, 11 Drawing Sheets

FIG. 3A

MAP TABLE

42d

| AREA NUMBER | MAP NUMBER | MAP IMAGE HEAD ADDRESS | MAP IMAGE SIZE |
|---|---|---|---|
| 01 | 01 | ADDRESS a | 600 |
| 01 | 02 | ADDRESS b | 720 |
| 01 | 03 | ADDRESS c | 512 |
| ⋮ | ⋮ | ⋮ | ⋮ |
| 02 | 01 | ADDRESS d | 512 |
| 02 | 02 | ADDRESS e | 256 |
| ⋮ | ⋮ | ⋮ | ⋮ |
| 03 | 01 | ADDRESS f | 512 |
| ⋮ | ⋮ | ⋮ | ⋮ |

ENCOUNTERING AREA TABLE

42e

| AREA NUMBER | MAP NUMBER | AREA POINT | AREA COORDINATE DATA |
|---|---|---|---|
| 02 | 03 | 3A | COORDINATE 3A |
| 02 | 04 | 4A | COORDINATE 4A |
| 02 | 04 | 4B | COORDINATE 4B |
| 02 | 06 | 6A | COORDINATE 6A |
| 02 | 07 | 7A | COORDINATE 7A |
| 02 | 12 | 12A | COORDINATE 12A |
| ⋮ | ⋮ | ⋮ | ⋮ |

ENCOUNTER MAP TABLE 122c

| AREA NUMBER | MAP NUMBER | AREA POINT | ENCOUNTERING PROBABILITY SETTING VALUE |
|---|---|---|---|
| 02 | 03 | 3A | 4 |
| 02 | 04 | 4A | 4 |
| 02 | 04 | 4B | 4 |
| 02 | 06 | 6A | 4 |
| 02 | 07 | 7A | 4 |
| 02 | 12 | 12A | 4 |
| ⋮ | ⋮ | ⋮ | ⋮ |

ENCOUNTERING PROBABILITY SETTING TABLE 122d

| ENCOUNTERING PROBABILITY SETTING VALUE | NUMBER OF ANNIHILATION TIME | ENCOUNTERING PROBABILITY |
|---|---|---|
| 4 | NONE | 100% |
| 3 | ONCE | 45% |
| 2 | TWICE | 20% |
| 1 | MORE THAN THREE TIMES | 10% |
| 0 | — | 0% |

122da 122db 122dc

FIG. 10A
ENCOUNTER MAP TABLE  122c

| AREA NUMBER | MAP NUMBER | AREA POINT | ENCOUNTERING PROBABILITY SETTING VALUE | PRIOR EVENT FLAG |
|---|---|---|---|---|
| 01 | 03 | 3A | 4 | 1 |
| 01 | 04 | 4A | 4 | 0 |
| 01 | 04 | 4B | 4 | 0 |
| 01 | 06 | 6A | 4 | 0 |
| 01 | 07 | 7A | 4 | 0 |
| 01 | 12 | 12A | 4 | 0 |
| ⋮ | ⋮ | ⋮ | ⋮ | ⋮ |

122ca  122cb  122cc  122cd  122ce

FIG. 10B
ENCOUNTER MAP TABLE  122c

| AREA NUMBER | MAP NUMBER | AREA POINT | ENCOUNTERING PROBABILITY SETTING VALUE |
|---|---|---|---|
| 01 | 03 | 3A | 4 |
| 01 | 04 | 4A,4B | 4 |
| 01 | 06 | 6A | 4 |
| 01 | 07 | 7A | 4 |
| 01 | 12 | 12A | 4 |
| ⋮ | ⋮ | ⋮ | ⋮ |

122ca  122cb  122cc  122cd

FIG. 10C
ENCOUNTER MAP TABLE  122c

| AREA NUMBER | MAP NUMBER | AREA POINT | NUMBER OF ENCOUNTERING TIME |
|---|---|---|---|
| 01 | 03 | 3A | 2 |
| 01 | 04 | 4A | 1 |
| 01 | 04 | 4B | 0 |
| 01 | 06 | 6A | 2 |
| 01 | 07 | 7A | 0 |
| 01 | 12 | 12A | 0 |
| ⋮ | ⋮ | ⋮ | ⋮ |

122ca  122cb  122cc  122cf

VIDEO GAME APPARATUS, VIDEO GAME METHOD AND STORAGE MEDIUM

BACKGROUND OF THE INVENTION

1. Field of the Invention

The present invention relates to a technique for controlling an event occurring probability, for example, an encountering probability that a character, moving on a map, encounters an enemy character in a video game.

2. Description of the Related Art

Of video games, there are RPGs (Role Playing Games) in which a player can make a game progress while he/she controls the game so as a character (hereinafter referred to as player character) to improve in accordance with a player operation. In general, the player character encounters in a constant probability another character (hereinafter referred to as enemy character), showing hostility toward the player character, while the player character moves on a map in RPGs. The player controls the game so that the player character battles the enemy character and the player character gains a predetermined experience level as a result of winning battle with enemy characters. The player character sequentially improves while increasing its power every time the experience value reaches a predetermined value.

In conventional RPGs, a constant probability that the player character encounters the enemy characters has been set, regardless of whether the enemy characters whom the player character encounters retain a high experience value or a low experience value. Generally speaking, whether enemy characters retain a high experience value or a low experience value depends on the power of the enemy characters, that is, their experience value is in proportion to their power. When the player character encounters an enemy character having a relatively low value, the player has to go through a troublesome battle against the enemy character, whereby the player character does not gain significantly due to the low experience value of the enemy character. Thus, the smooth progress of the game has been obstructed.

In some recently-developed RPGs, the probability that the player character encounters the enemy characters varies when the player character is equipped with a particular item. However, in equipping the player character such a particular item, the probability that the player character encounters the enemy characters can vary uniformly, regardless of the level of the player character. Due to this, in equipping the player character with such an item, an increase in the probability that the player character has to have an ineffective battle with the enemy characters for the sake of raising the power of the player character, or a decrease in the probability that the player character has an efficient battle against the enemy characters for the sake of raising the power of the player character occurs as a problematic matter.

SUMMARY OF THE INVENTION

It is an object of the present invention to provide a video game which can make a game progress smoothly by controlling a probability that an event, such as a battle against an enemy character etc., occurs.

According to the first aspect of the present invention, there is provided a video game apparatus comprising: event occurring area storage means for storing a position of an event occurring area on a map where a predetermined event is to occur and which is set on the map functioning as a movement area where a character moves in accordance with an externally transmitted input; area determination means for determining whether the character has reached the event occurring area stored in the event occurring area storage means; and event occurrence means for causing an event, set in the event occurring area, to occur in accordance with a probability corresponding to number of times in which an event has occurred in the event occurring area and/or number of times in which the occurring event has been completed, when the area determination means determines that the character has reached the event occurring area.

The event occurrence means may decrease the probability that the event will occur, in accordance with an increase in the number of times in which the event has occurred in the event occurring area or the number of times in which the occurring event has been completed.

The event occurrence means may cause the event, set in the event occurring area, to occur, when the number of times in which the event has occurred in the event occurring area or the number times in which the occurring event has been completed is a predetermined value.

In the above-described video game apparatus, an event occurring probability set for the event occurring area is controlled in accordance with the number of times in which the event has occurred or the number of times in which the occurring event has been completed, when the character has reached the event occurring area on the map. Particularly, in such a case where the event occurrence means decreases the probability that the event occurs if the number of times in which the event has occurred or the number of times in which the occurring event has been completed in the event occurring area increases, the player does not have to repeatedly go through troublesome battles against the enemy characters so that the game can progress smoothly.

When the number of times in which the event has occurred or the number of times at the occurring event has been completed in the event occurring area is a predetermined number, an event set for the event occurring area occurs. In such a case, if the predetermined value is, for example, 0, an event necessary for the progress of the game occurs at least once. Thus, the progress of game should be exciting enough.

The above-described video game apparatus may further comprise: setting value storage means for storing predetermined setting values in a manner corresponding to respective event occurring areas stored in the event occurring area storage means; and probability storage means for storing event occurring probabilities corresponding to the setting values stored in the setting value storage means. In this case, the event occurrence means may comprise: event occurrence determination means for determining whether to cause the event to occur in the event occurring area where the character has reached, in accordance with the occurring probability stored in the probability storage means and the setting value stored in the setting value storage means; event attaining means for attaining the event occurrence when the event occurrence determination means determines to cause the event to occur; and setting value updating means for updating the setting value of the event occurring area which is stored in the setting value storage means, when the event attaining means attains the event occurrence or the occurring event has been completed.

In such a case, the setting value storage means may store a single setting value corresponding to a plurality of event occurring areas.

The above-described video game apparatus may further comprise counting means for counting the number of times in which the event has occurred according to the event occurrence means or the number of times in which the event is completed, in the event occurring area. In such a case, the event occurrence means may comprise: means for performing a predetermined calculation on the basis of the number of times, counted by the counting means, in which the event has occurred in the event occurring area or the number of times in which the event has been completed, and for calculating a probability that the event is to occur in the event occurring area; and means for causing an event to occur in accordance with the probability which is calculated by the calculation means.

The above-described video game apparatus may further comprise: prior event information storage means for storing, in a manner corresponding to the event occurring area prior event information representing whether there is another event which is to be completed prior to the event occurrence in the event occurring area. In such a case, the event occurrence means may cause the event to occur in accordance with the prior event information corresponding to the event occurring area where the player character has reached.

It should be noted that the event in the above-described video game apparatus may be a battle held between the character and the enemy characters, for example.

The battle held between the character and the enemy characters may take place on the map functioning as the movement area where the player character moves. The event occurrence means may comprise operation mode changing means for changing the operation mode of the player character from a moving operation to a battling operation, when causing the event to occur.

According to the second aspect of the present invention, there is provided a video game apparatus comprising an input device, a storage device and a processing device, wherein the input device performs inputting to move a character on a map; the storage device stores a position of an event occurring area which is set on the map and where a predetermined event is to occur, and stores a program comprising: a character movement step of causing said character to move on the map in accordance with an input from the input device; a determination step of determining whether the character has reached the stored event occurring area; and an event occurrence step of causing the event, set in the event occurring area, to occur in accordance with a probability corresponding to the number of times in which the event has occurred in the event occurring area or number of times in which the occurring event has been completed, when it is determined that the character has reached the event occurring area: the processing device executes the program stored in the storage device; and the display device displays an image corresponding to a movement of the character on the map where the character moves when the processing device executes the character movement step of the program stored in the storage device, and an image corresponding to the event which occurs when the processing device executes the event occurrence step of the program.

The event occurrence step of the program decreases the number of times in which the event has occurred, in accordance with an increase in the number of times in which the event has occurred in the event occurring area which the character has reached or the number of times in which the occurring event has been completed.

The event occurrence step of the program may cause the event set in the event occurring area to occur, when the number of times in which the event has occurred in the event occurring area or the number of times in which the occurring event has been completed is a predetermined value.

In the above-described video game apparatus, the probability that the event set in the event occurring area occurs is controlled in accordance with the number of times in which the event has occurred or with the number of times in which the occurring event has been completed, when the player character has reached the event occurring area on the map. Particularly, in the event occurrence step, the probability that the event occurs decreases, if the number of times in which the event has occurred in the event occurring area or the number of times in which the occurring event has been completed increases. In such a case, the player does not have to go through continuously repeated troublesome battles against the enemy characters, so that the game progresses smoothly.

In the event occurrence step, when the number of times in which the event has occurred in the event occurring area or the number of times in which the occurring event has been completed is a predetermined value, the event set for the event occurring area occurs, under which condition an event necessary for the progress of the game occurs at least once. Thus, the progress of the game will be entertaining and exciting.

In the above-described video game apparatus, the event which occurs by executing the event step of the program may take place on the map where the player character moves. In such a case, the display device may process and displays a display image, at a transition from the movement of the player character on the map in the character movement step of the program to the occurrence of the event in the event occurrence step of the program.

Accordingly, the player can be easily informed that there is a transition from the general processing of moving the character on the map to the processing of executing the event.

The event in the above-described video game apparatus may be a battle held between the character and an enemy characters, for example.

The battle held between the character and the enemy characters may take place on the map functioning as a movement area where the player character can move. The event occurrence step of the program may include a step of changing the operation mode of the player character from moving to battling, when causing the event to occur.

In order to achieve the above-described object, according to the third aspect of the present invention, there is provided a method of controlling an event occurring probability comprising: a character movement step of causing a player character on a map to move in accordance with an externally transmitted input; a determination step of determining whether the character has reached an event occurring area which is pre-set on the map and where a predetermined event is to occur; and an event occurrence step of causing the event, set in the event occurring area, to occur in accordance with a probability corresponding to the number of times in which the event has occurred in the event occurring area or the number of times in which the occurring event has been completed, when it is determined that the character has reached the event occurring area.

The event occurrence step may decrease the number of times in which the event has occurred, when the number of times in which the event has occurred in the event occurring area where the character has reached or the number of times in which the occurring event has been completed has increased.

The event in the method of controlling the event occurring probability may, for example, be a battle held between the character and enemy characters.

When the method of controlling the event occurring probability, having the above steps is executed on a machine exclusively for games or a general-purpose computer, functions and effects similarly resulted from the above-described video game apparatus can be obtained thereon.

The above-described video game apparatus can be realized by storing on a storage medium a program for executing the respective steps which the method of controlling the event occurring probability comprises, reading the program into a computer from the storage medium and executing the same. By employing the form of the storage medium which stores the program, development, sales and distribution of the program can be produced as software media, independently separated from being as part of a device. By installing the program in the hardware of the general-purpose computer device, the above-described video game apparatus can likewise be realized.

The program or data for realizing the steps which the method of controlling the event occurring probability comprises may be embodied in a carrier wave, so that the program or data can be easily distributed and sold through some network.

Other advantages and meritorious features of the present invention will become more fully understood from the preferred embodiment, the claims, the drawings, and the brief description of which follows.

BRIEF DESCRIPTION OF THE DRAWINGS

FIG. 3A is a diagram showing a map table.

FIG. 3B is a diagram showing an encountering area table.

FIG. 6A is a diagram showing an encounter map table.

FIG. 6B is a diagram showing an encountering probability setting table.

FIGS. 10A to 10C are diagrams each showing another example of the encounter map table.

DETAILED DESCRIPTION OF THE PREFERRED EMBODIMENT

A preferred embodiment of the present invention will now be described with reference to the accompanying drawings.

Figure 1:
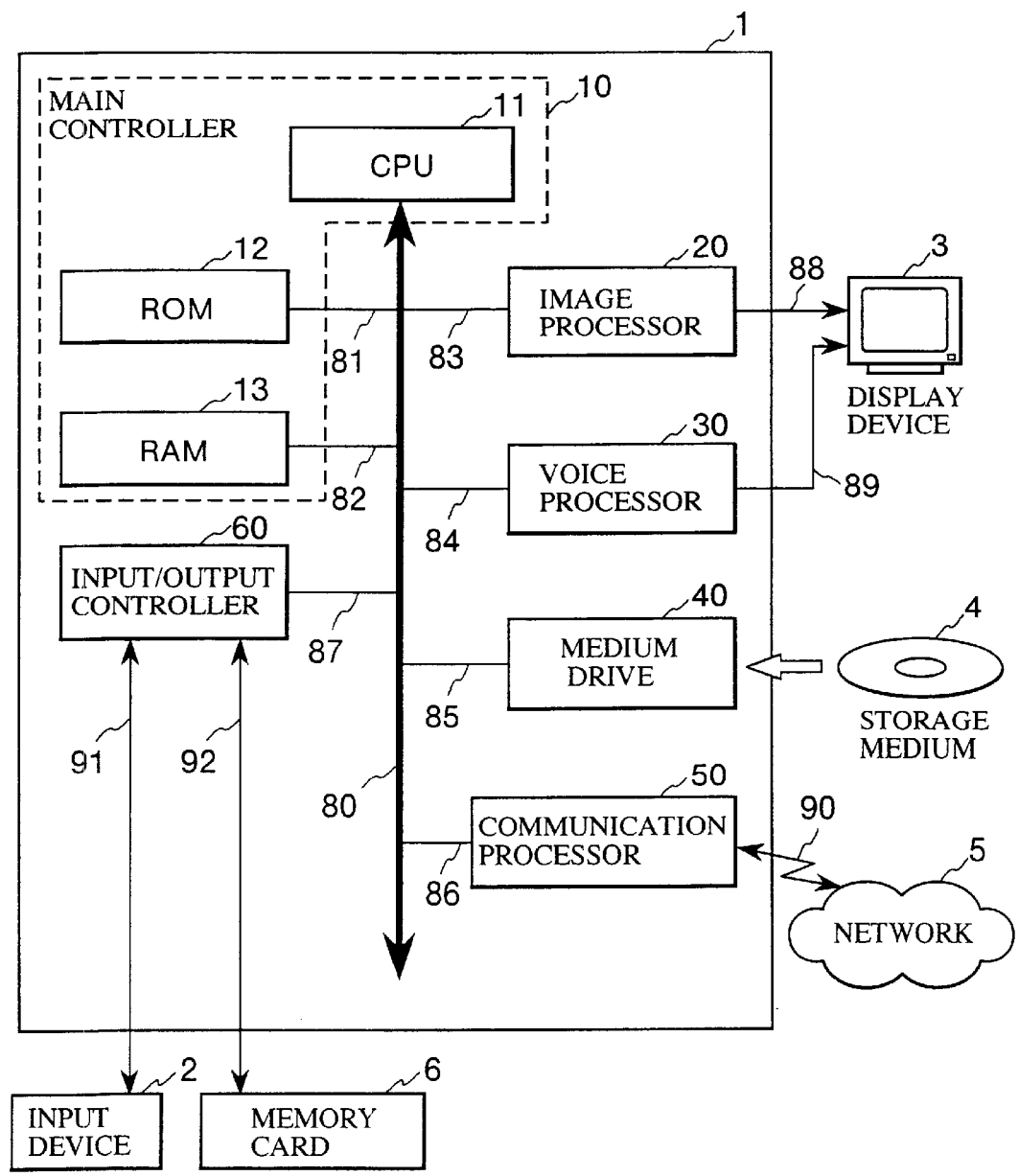
FIG. 1 is a block diagram showing the structure of a video game system according to an embodiment of the present invention.

FIG. 1 is a block diagram showing the structure of a video game system according to this embodiment of the present invention. The video game system of this embodiment comprises a video game apparatus 1 having main functions of the video game system, an input section 2 for giving input instructions to the video game apparatus 1 and a display device 3 displaying the contents of the video game executed by the video game apparatus 1, for example. A storage medium 4 which records a game program and data and which may be a CD-ROM (Compact Disc Read Only Memory) or the like is inserted in the video game apparatus 1. The video game apparatus 1 can be connected to a network 5 via a communication line 90 if necessary, and a memory card 6 for storing data regarding the progress of the game can be inserted therein.

The video game apparatus 1 reads out the game program and data stored on the storage medium 4 and executes the read out game program by setting the storage medium 4 thereto. The detailed structure of the video game apparatus 1 will be explained later.

The input section 2 is a controller as an input interface for transmitting player instructions. The input section 2 comprises buttons for starting the video game and for giving instructions to input commands, and cross-directional keys so that a character or a cursor in the video game moves in any of the four directions.

The display device 3 mainly has a function as an image display device which reproduces a video output signal (picture signal) 88 and a function as a voice output device which reproduces an audio output signal (voice signal) 89. In general, a television receiver having a CRT (Cathode Ray Tube) is employed as the display device 3, however, a television receiver comprising a liquid crystal display device (LCD) or a plasma display device (PD) can be used as well. The CRT, LCD or PD may be a separate display device that can be used in combination with a voice reproduction device such as an audio device or the like.

The storage medium 4 stores the game program and data for realizing the video game in this embodiment of the present invention. The data stored on the storage medium 4 will be described in more detail later. A power supply button (not shown) arranged on the video game apparatus 1 is turned on after the storage medium 4 has been inserted in the video game apparatus 1. In such a case, the video game apparatus 1 reads out the game program, program data and image data which are all stored on the storage medium 4 in order that the predetermined video game processing is executed on the basis of the read game program.

The network 5 is a communication network, such as the Internet or a commercial network connected through a communication line 90, such as a cable line or a radio wave. The memory card 6 is a means for saving data regarding game progress which a user desires to save at various points in the game even after the power supply of the video game apparatus 1 is turned off or is reset, and embodies a nonvolatile semiconductor memory, such as a flash memory or the like.

The structure of the video game apparatus 1 will now specifically be described. As illustrated in FIG. 1, the video game apparatus 1 comprises a main control section 10 in charge of basic calculations, an image processing section 20 in charge of image processing, a voice processing section 30 in charge of voice processing, a medium drive section 40 in charge of processing around the storage medium 4, a communication processing section 50 in charge of communication processing performed between the external network 5 and the video game apparatus 1, and an input/output control section 60 in charge of input/output processing performed by an operating system.

The main control section 10 includes a CPU (Central Processing Unit) 11 directly connected to a bus 80, a ROM (Read Only Memory) 12 connected to the bus 80 via a signal line 81, and a RAM (Random Access Memory) 13 connected to the bus via a signal line 82. The image processing section 20 is connected to the bus 80 via a signal line 83.

Similarly, the voice processing section 30, the medium drive section 40, the communication processing section 50 and the input/output control unit 60 are all connected to the bus 80 via signal lines 84 to 87 respectively. Because of this, the main controlling section 10, the image processing section 20, the voice processing section 30, the medium drive section 40, the communication processing section 50 and the input/output control section 60 can perform data communications with one another via the bus 80.

The CPU 11 is the backbone part of the main controlling section 10 and is to execute a program stored in the ROM 12 and RAM 13. The ROM 12 is a non-volatile semiconductor memory storing a boot loader used during the period of the start up time. The RAM 13 is a volatile semiconductor memory which stores the program executed by the CPU 11 and data required for executing the program, or which is used as a working area while the program is executed by the CPU 11. Allotment of areas to the RAM 13 and data stored therein will be explained later in more detail.

The image processing section 20 is used for performing lighting calculations and for transforming coordinates at the high speed necessary for image display, that is, calculating a matrix in a fixed decimal point form or a vector by means of a parallel processing system. The image processing section 20 has a CRTC (Cathode Ray Tube Controller) function for image display and a high-speed drawing function for a polygon in a frame buffer (not shown) both of which are executed in accordance with an order for polygon drawing transmitted from the CPU 11. The image processing section 20 has a two-dimensional address space which is independent from the CPU 11 and wherein the frame buffer is mapped.

The voice processing section 30 reproduces a voice signal at a sampling frequency of 44.1 KHz, referring to ADPCM (Adaptive Differential Pulse Code Modulation) sample data as a sound source. The voice processing section 30 carries a plurality of voices so that simultaneous articulation is able to be performed. The voice processing section 30 can set up, for every voice, various functions of pitch conversion, timely changes in the pitch, a noise source, envelope and volume, in addition to an on/off switch of a digital reverberator.

The medium drive section 40 drives the set storage medium 4, reads out data stored on the storage medium 4 with an optical pick up, and transfers the read program or data to the main controlling section 10. If the CD-ROM is employed as the storage medium 4, the medium drive section 40 can be a CD-ROM drive or the like.

The communication processing section 50 performs data communications with an external device connected to the network 5 and is connected to the network 5 through the communication line 90 if necessary. The input/output control section 60 is an interface for connecting the input section 2 and the memory card 6 and is connected to the input section 2 and the memory card 6 via signal lines 91 and 92 respectively.

The program and data items stored on the storage medium 4 will now be specifically described.

Figure 2:
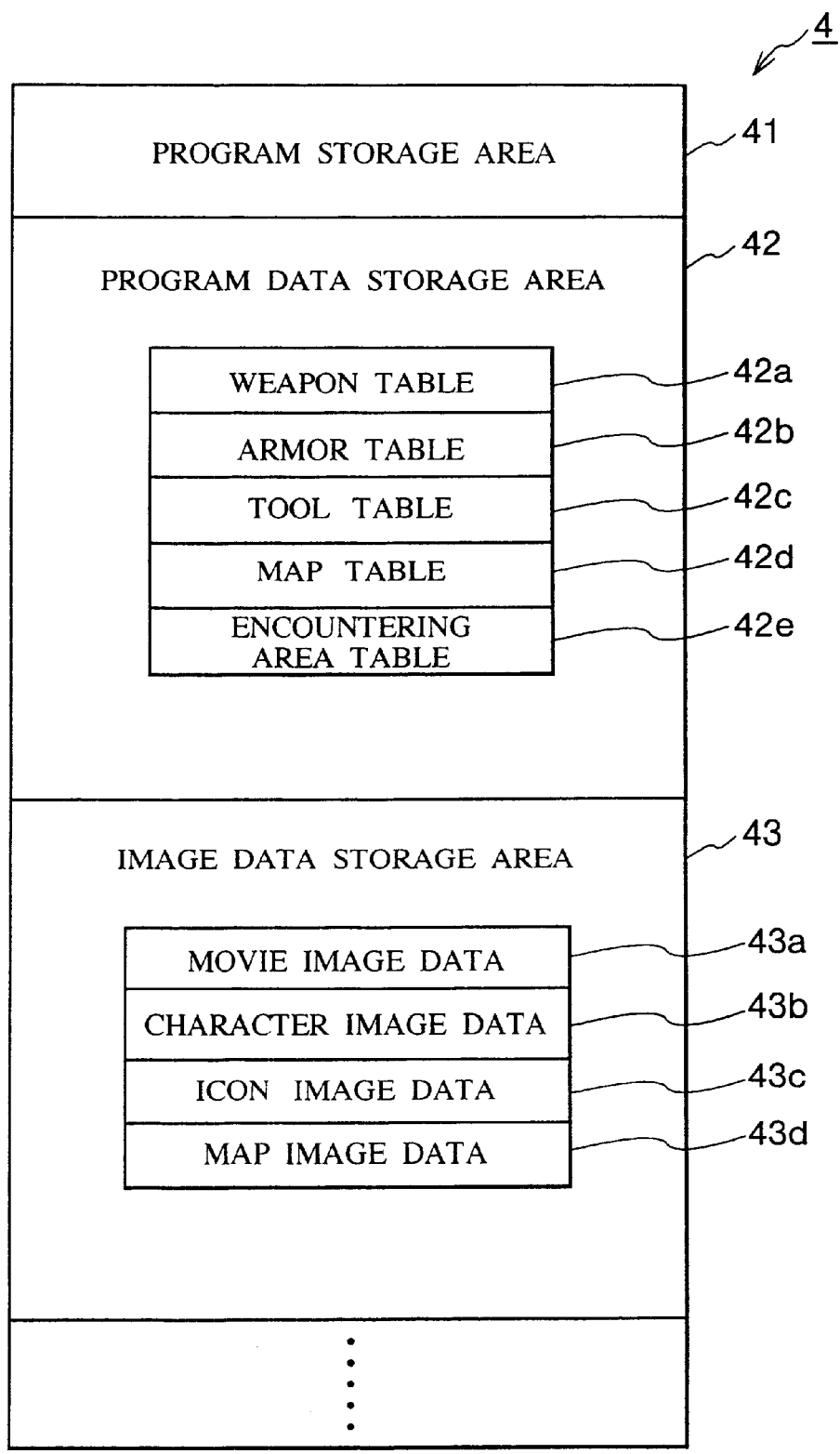
FIG. 2 is a diagram showing a program and data which are stored on a storage medium in FIG. 1.

FIG. 2 is a diagram showing the program and data items stored on the storage medium 4 and their corresponding storage areas. As shown in FIG. 2, the storage medium 4 has a program storage area 441, a program data storage area 42 and an image data storage area 43.

The program data storage area 41 stores a program of the video game of this embodiment. The program data storage area 42 is to store data necessary for the progress of the game, such as a weapon table 42a, an armor table 42b, a tool table 42c, a map table 42d and an encountering area table 42e.

The image data storage area 43 is to store image data for displaying an image on the display device 3 during the practice of the video game. That is, the image data storage area 43 stores movie image data 43a of a CG (Computer Graphics) movie, character image data 43b representing image data of a player character moving in accordance with an order from the player and an enemy character, icon image data 43c used for selecting the order which is to be made by the player during the progress of the game and map image data 43d, etc., for example.

FIG. 3A is a diagram showing the map table 42d in FIG. 2. The map table 42d is used as reference to read out a map required by the CPU 11, and stores data items associated with each other, such as area number 42da representing a game progressive area, map number 42db set to each of divisional areas, map image head address 42dc of each corresponding map, and map image size 42dd representing an image size of each map.

More specifically, in this embodiment, the region in which the player character can move is divided into a plurality of divisional areas, and a discrimination number is assigned to each area and is stored in the column of the area number 42da within the map table 42d. Each of the areas includes a plurality of maps each having the discrimination number which is stored in the column of the map number 42db in the map table 42d. Further, columns of the map image head address 42dc and the map image size 42dd are stored in the map table 42d, in a manner corresponding to the respective maps. The CPU 11 can retrieve a desired map image by reading out the map image data 43d represented by the map image size 42dd from the address specified by the map image head address 42dc.

FIG. 3B is a diagram showing the encountering area table 42e in FIG. 2. Of the maps shown in the map table 42d, those maps including sites where it is determined whether the player character actually encounters the enemy character thereat are specified in. The encountering area table 42e stores data items associated with each other, such as area number 42ea, map number 42eb, area point 42ec indicating an area where the player character encounters the enemy character, and area coordinate data 42ed representing coordinate data of the area point 42ec.

The area point 42ec and the area coordinate data 42ed are stored in the encountering area table in a manner corresponding to the maps including the sites where it is determined whether the player character actually encounters the enemy character thereat. The CPU 11 determines whether the player character steps into the area point within the present map by determining whether the player character is in an area represented by the coordinates shown in the area coordinate data 42ed.

Figure 4:
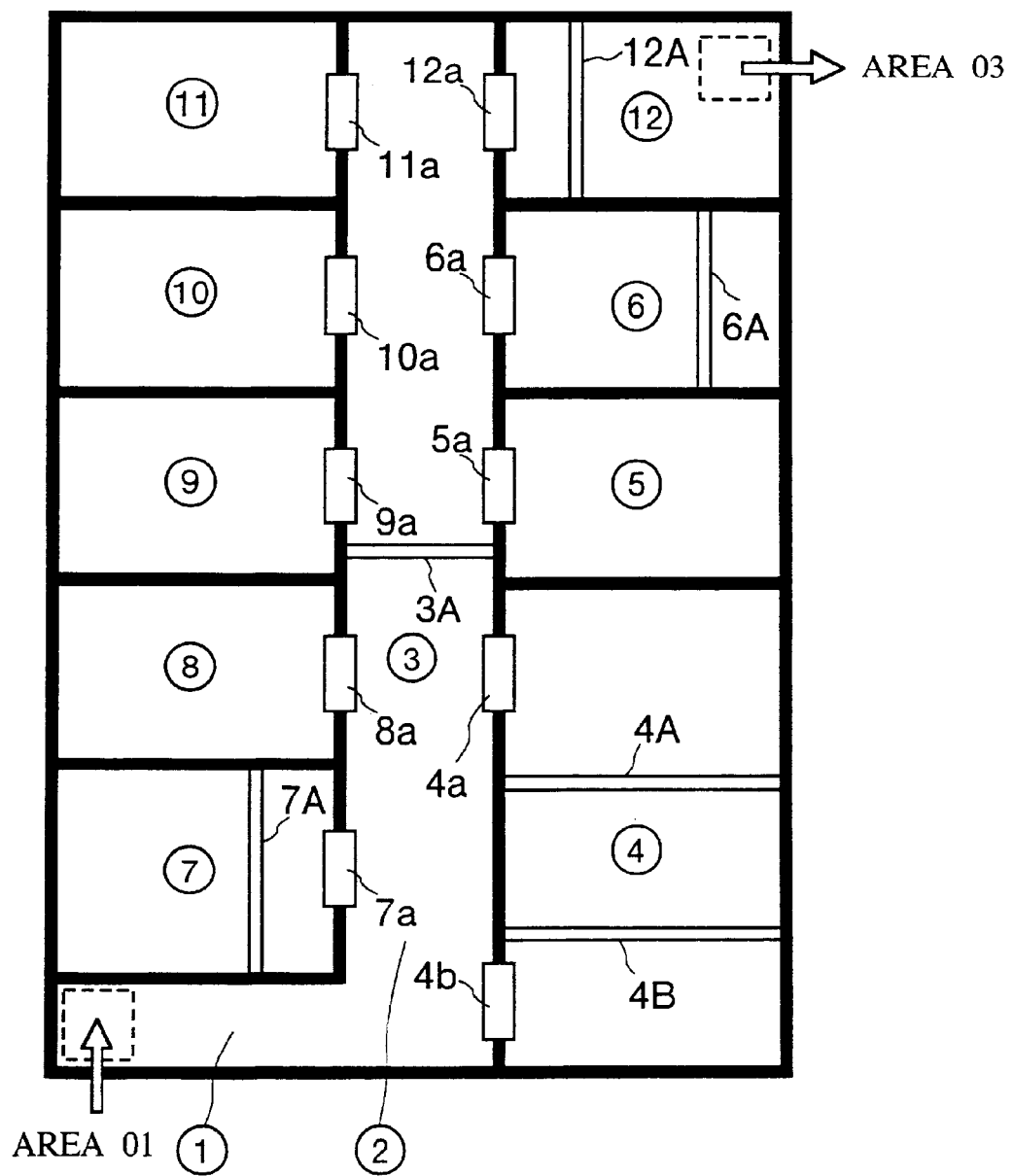
FIG. 4 is a diagram exemplifying map image data.

FIG. 4 is a diagram showing an example of the map image data 43d, and shows an example of an area "02" representing a value "02" in the column of the area number 42da. The map image data 43d stores a plurality of image data items which are administered in the column of the map number 42db, and which are included in the column of the area number 42da. For example, the area "02" has twelve maps, namely maps "01" to "12". Of the twelve maps, there are maps to which the area point 43ec in the encountering area table 42e in FIG. 3B is set.

For the area "02", there are set six area points, 3A, 4A, 4B, 6A, 7A and 12A, and encountering processing (this will be explained later) is performed when the player character steps into any one of the area points. In the area "02", as shown in FIG. 4, there are provided a plurality of doors, 4a, 4b, 5b, . . . 12a in order that the maps can be partitioned thereby. Whenever the player character opens any one of the doors 4a, 4b, 5b, . . . 12a, data representing the next map is read out from the storage medium 4 and is stored in the RAM 13 as present map data 122b.

Figure 5:
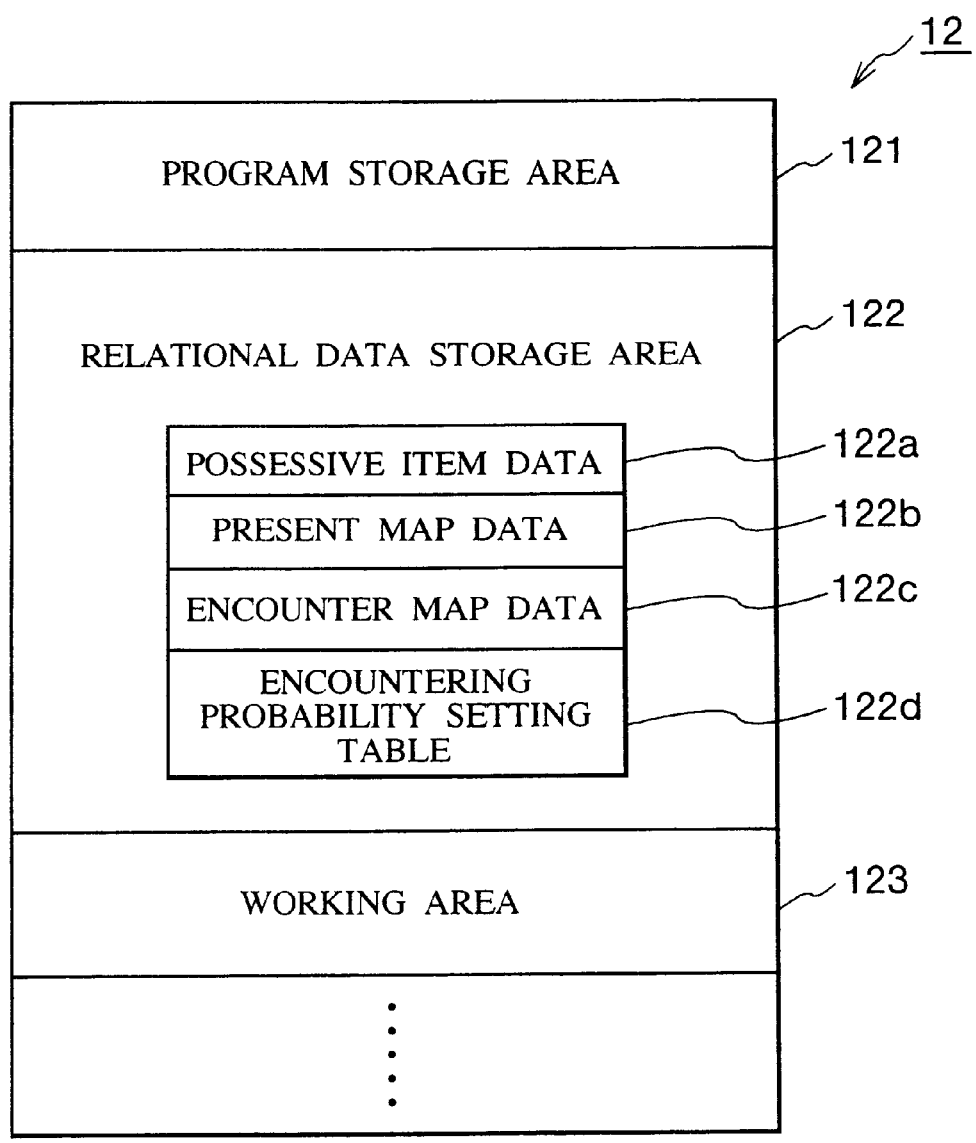
FIG. 5 is a diagram showing areas to be allotted to an RAM shown in FIG. 1.

Areas allotted to the RAM 13 and data stored therein will now be described. FIG. 5 is a diagram showing the areas allotted to the RAM 12. As illustrated, the RAM 13 has a program storage area 121, a relational data storage area 122 and a working area 123.

The program storage area 121 stores the program stored in and transferred from the program storage area 41 of the storage medium 4. The CPU 11 executes the program stored in the program storage area 121 and performs processing for the progress of the game. The relational data storage area 122 stores data necessary for the progress of the game, for example, possessive item data 122a representing which items (including weapons, armor and the like) are currently possessed by the player character, present map data 122b representing the coordinates of the point at which the player character is currently positioned on the map, an encounter map table 122c and an encountering probability setting table 122d.

The working area 123 is used as a working area when the CPU 11 executes the program stored in the program storage area 121.

FIG. 6A is a diagram showing the encounter map table 122c in FIG. 5. As seen from FIG. 6A, the encounter map table 122c stores data items associated with each other, such as area number 122ca, map number 122cb, area point 122cc, and encountering probability setting value 122cd for controlling the probability indicating the chance that the player character actually encounters the enemy character. For the respective data stored as the area point 122cc, the initial value of the encountering probability setting value 122cd is 4 which value 122cd is decreased by 1 until it becomes 1, every time the player character annihilates the enemy characters in the area.

FIG. 6B is a diagram showing the encountering probability setting table 122d in FIG. 5. The encountering probability setting table 122d, as illustrated in FIG. 6B, stores data items associated with each other, such as encountering probability setting value 122da, the number of times 122db the enemy character has been annihilated and the probability of the next encounter with that enemy character 122dc. When the player character steps into the above-described area point, it encounters the enemy character in the encountering probability corresponding to the encountering probability value 122da set for the area.

Under the control of the CPU 11, the program and data stored on the storage medium 4 shown in FIGS. 2 to 4 are read out from the storage medium 4 by the medium drive section 40, if needed, and are respectively transferred to a predetermined area in the RAM 13 via the bus 80.

Figure 7:
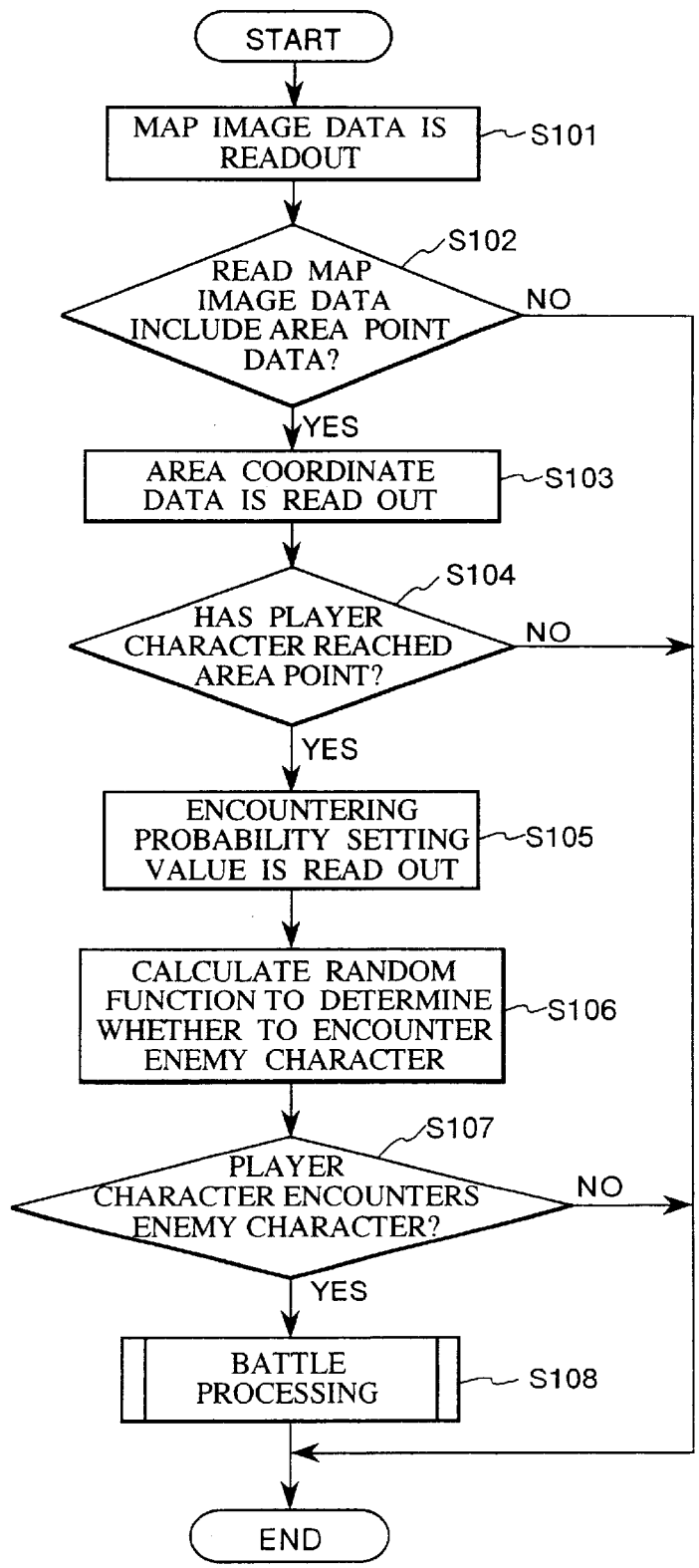
FIG. 7 is a flowchart for explaining encountering processing in this embodiment of the present invention.

Operations of the video game system according to this embodiment will now be described. FIG. 7 is a flowchart for explaining processing for the progress of the game in this embodiment. For the sake of the progress of the game, the CPU 11 simultaneously performs processing for moving the player character on the map in accordance with the input instruction from the input section 2 and performs processing for giving instructions to the player character, in addition to the processing shown in the aforementioned flowchart. The map table 42d and the encountering area table 42e are read out from the storage medium 4 to a predetermined area in the RAM 12, prior to the processing of the flowchart shown in FIG. 7; further, the encounter map table 122c in its initial stage is prepared by the CPU 11.

As the processing of the flowchart shown in FIG. 7 begins, the map image data 43d corresponding to a point where the player character is currently positioned is read out from the storage medium 4 by the medium drive section 40. The read out data is then transferred to the area indicated by the present map data 122b of the relational data storage area 122 in the RAM 13 via the bus 80 (Step S101). However it is noted that if the map image data 43d corresponding to the area where the player character is currently positioned has already been read out, the above processing in Step S101 is not performed.

By referring to the encountering area table 42e, the CPU 11 determines whether the read map image data 43d includes the area point data 42ec or not (Step S102). If the area point 42ec is not set thereto (Step S102; No), then the flow ends.

If the area point 42ec is set thereto (Step S102; Yes), the area coordinate data 42ed which is stored in the encountering area table 42e in a manner corresponding to the area point 42ec is read out (Step S103). The read area coordinate data 42ed is compared with the present map data 122b, so that it is determined whether the player character has reached the area point 42ec (Step S104). If the player character has not reached the area point 42ec yet (Step S104; No), then the flow ends.

When the player character has reached the area point 42ec (Step S104; Yes), the encountering probability setting value 122cd which is stored in the encounter map table 122c in a manner corresponding to the area point 42ec is read out (Step S105). The CPU 11 calculates a random function so as to determine whether the player character actually will encounter the enemy character, in accordance with random numbers obtained as a result of the random function and the encountering probability 122dc stored in the encountering probability setting table 122d in a manner corresponding to the read encountering probability setting value 122c (Step S106).

In this way, it is determined whether or not the player character will actually encounter the enemy character (Step S107). In the case where the player character does not actually encounter the enemy character (Step S107; No), the flow ends. On the contrary, in the case where the player character actually encounters the enemy character (Step S107; Yes), "battle processing" is performed (Steps S108) and the flow ends.

Figure 8:
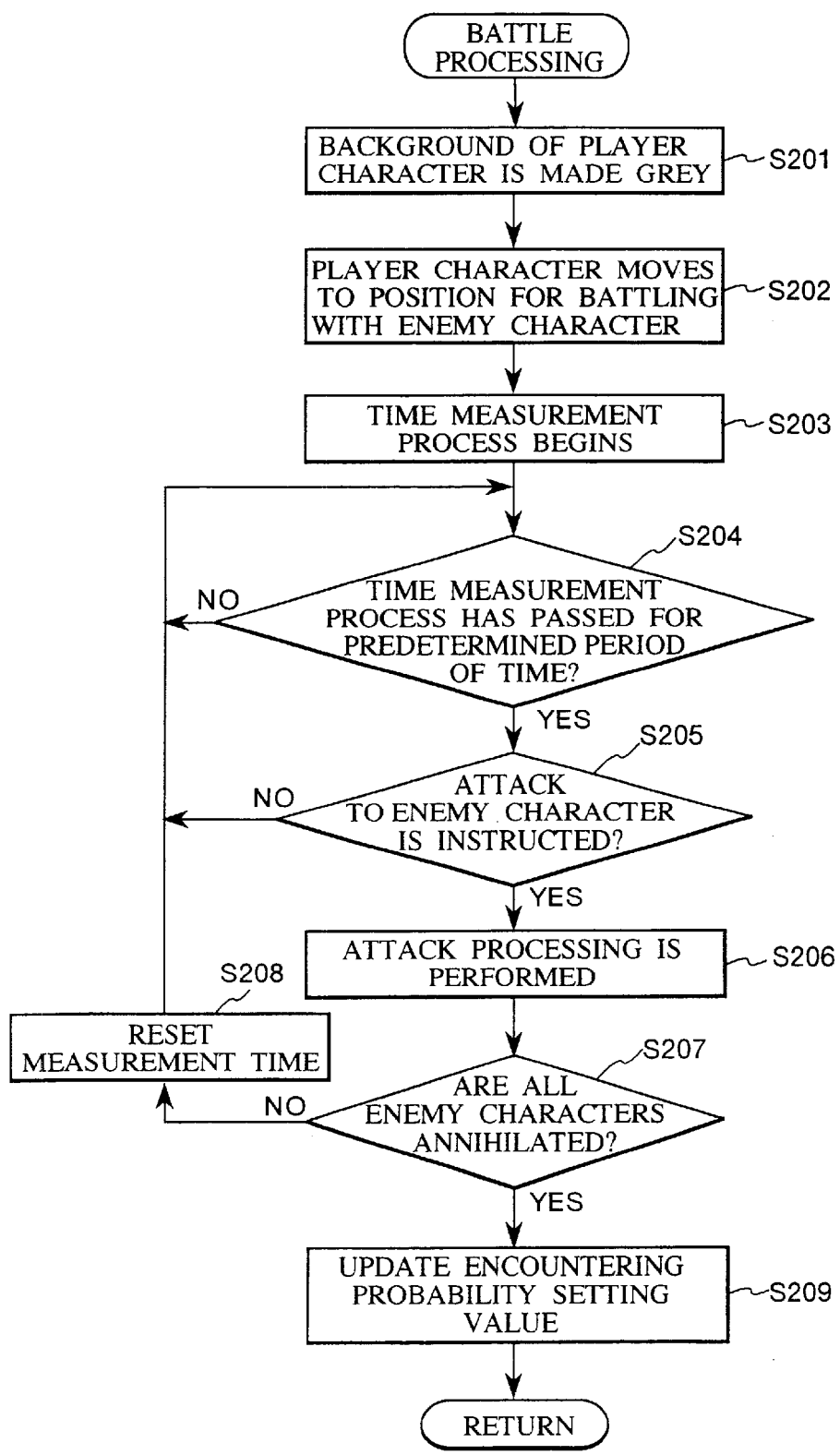
FIG. 8 is a flowchart for specifically explaining battle processing shown in FIG. 7.

FIG. 8 is a flowchart specifically showing the battle processing in Step S108. After the processing of the flowchart in FIG. 8 begins, the CPU 11 performs processing in which the map in the background of the player character is made gray and displayed for a predetermined period of time (Step S201) so as to inform the player that the player character has encountered the enemy character. This processing is done when the image processing section 20 generates image data in which color data of the background image is converted, after the CPU 11 transmits a predetermined instruction to the image processing section 20.

When the enemy character associated with the above-mentioned area point is positioned on the map, the player character is concurrently made to move to a predetermined position where a battle is to be held (Step S202). When the player character moves to the battle starting position, a time measurement process begins (Step S203), and the flow advances to Step S204.

In Step S204, the CPU 11 determines whether or not the process of measuring time has passed for a predetermined period of time (Step S204). This time period may vary depending on the weapons or armor which the player character possesses, or on the present status of the player character. Until the predetermined period of time has passed, the player character can not react to anything other than movement on the map, and the determination of Step S204 is repeated.

When the predetermined period of time has passed (Step S204; Yes), it is determined whether an attack on the enemy character has been instructed toward the player character by the input from the input section 2 which is executed by another routine (Step S205). If the attack on the enemy character is not instructed (Step S205; No), the flow goes back to Step S204.

If the attack on the enemy character is instructed (Step S205; Yes), processing for an attack directed from the player character to the enemy character is performed (Step S206). During this attack processing, the player character is made to attack the enemy character in a predetermined manner. Furthermore, for example, a value of any damage which the enemy character undergoes is calculated on the basis of the distance between the player character and the enemy character and on the basis of the weapons which the player character possesses. The value of the obtained damage is subtracted from the value of remaining physical strength of the enemy character in order that the subtracted value can be displayed.

Every time the attack processing is completed, the CPU 11 determines whether all enemy characters which appeared in Step S202 have been annihilated by the attacking, that is, whether the value of the remaining physical strength of all the enemy characters is "0" (Steps S207). If the enemy characters have not been annihilated thereby (Step S207; No), the measurement time is reset and restarts (Step S208), and the flow goes back to Step S204.

Conversely, if the enemy characters are annihilated thereby (Step S207; Yes), the encountering probability setting value 122cd which is stored in the encounter map table 122c in a manner corresponding to the area point is updated (Step S209). If the encountering probability setting value 122cd to be updated is any one of "4", "3", or "2", the value is decremented by 1. If the encountering probability setting value to be updated is "1" or "0", it is left as is. When the update on the encountering probability setting value 122cd is completed, the processing goes back to that of the flowchart shown in FIG. 7.

Consequently, as for the condition of the game which progresses in accordance with the flowcharts in FIGS. 7 and 8, the corresponding image data is formed in order by the CPU 11 and the image processing section 20, both of which are operated co-operatively, and is displayed on the display device 3 as an image by being output to the display device 3 as a picture signal. The player can determine which one of instructions is to be given to the player character, based on the image, and the game will progress by inputting a predetermined instruction from the input section 2.

Operations of the video game system according to this embodiment will now be explained specifically with reference to display examples shown in FIGS. 9A to 9D. In these display examples, the case where the player character encounters the enemy character in the area point 3A of the area number "02" and the map number "03" is described.

Figure 9A:
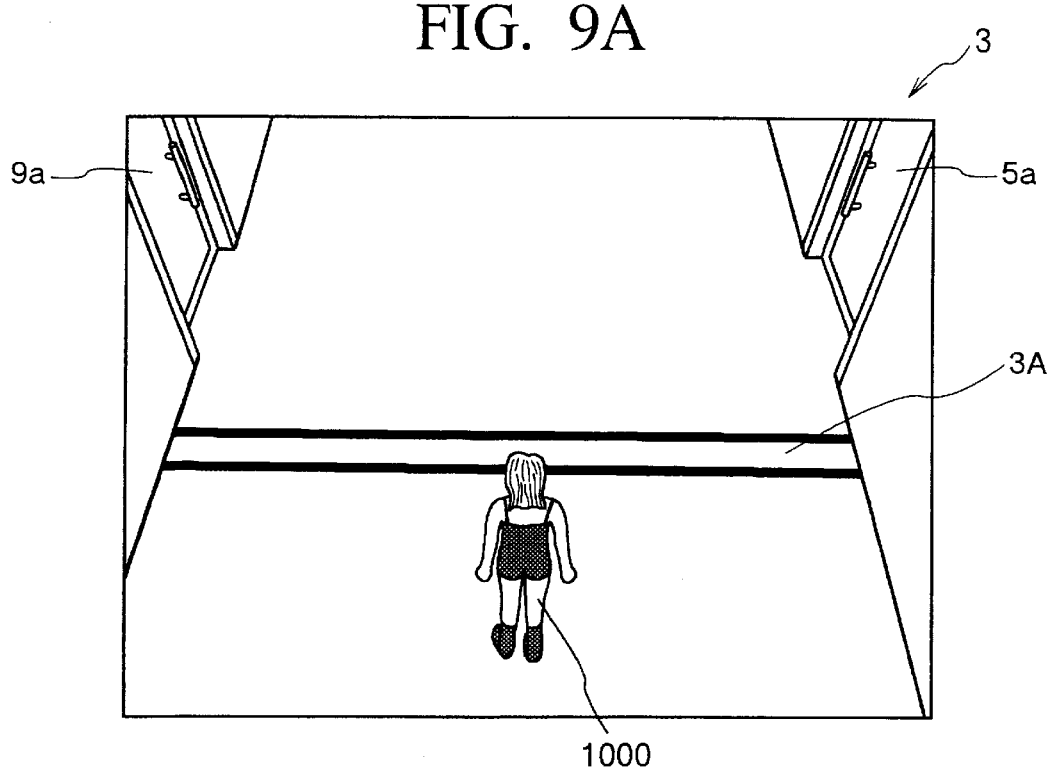
FIGS. 9A to 9D are diagrams each exemplifying progress of the game in the embodiment of the present invention.
Figure 9B:
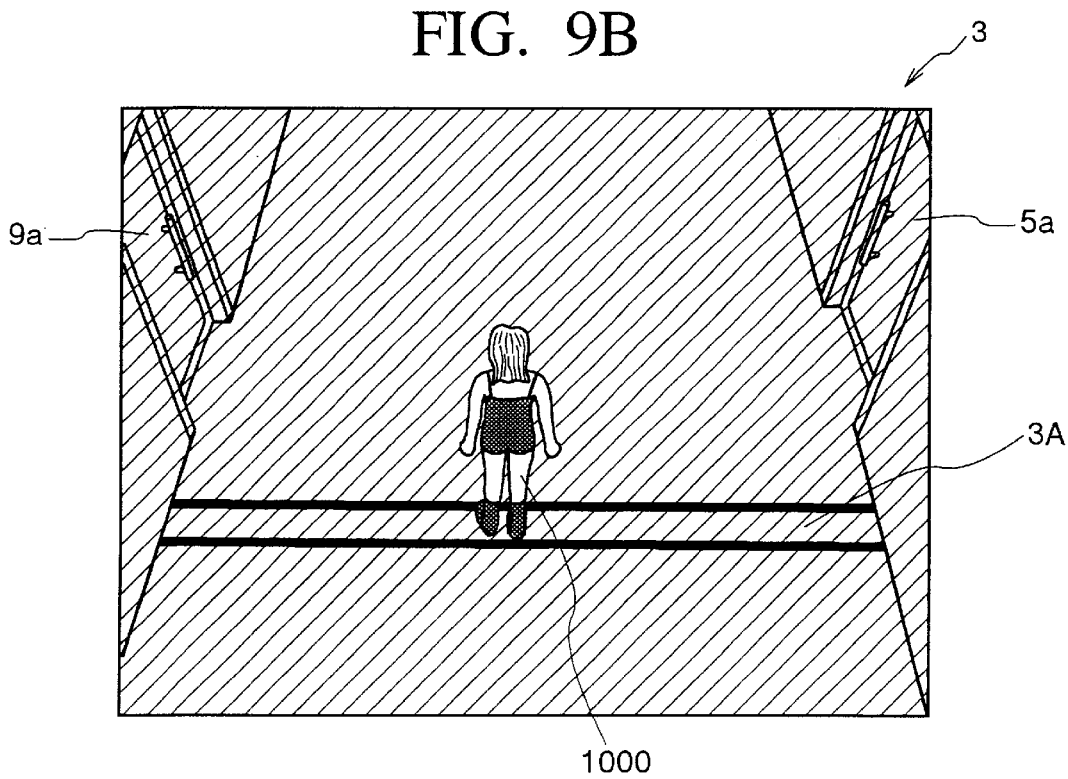

Assume that a player character 1000 is now approaching the area point 3A by the player operating the input section 2, as illustrated in FIG. 9A. It should be noted that the lines, shown in FIG. 9A, indicating the area of the area point 3A are not displayed on the actual display device 3, therefore, the player is not aware of the existence of the area point where the player character 1000 is to encounter the enemy character.

Assume that the player character 1000 is now in the area point 3A in accordance with the operation of the player from the input section 2. The encountering probability setting value 122cd corresponding to the area point 3A is "4", thus the encountering probability setting value 122cd that the player character encounters the enemy characters is 100%. In such a case, the player character 1000 has a 100% probability of encountering the enemy characters. The background image is made gray on the display device 3 for a predetermined time period so that the player is now informed that the processing for the battle held between the player character 1000 and the enemy characters has begun.

Figure 9C:
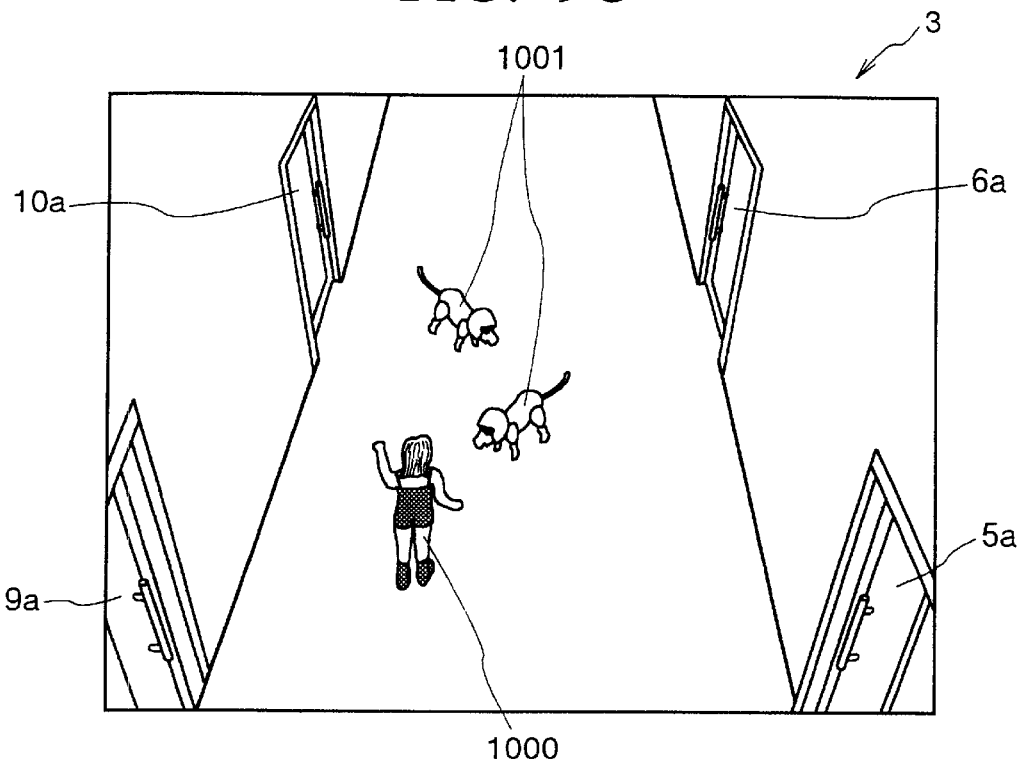

When the gray color of the background clears up, enemy characters 1001 appear on the map "03", as shown in FIG. 9C, and the player character 1000 is moved to a predetermined position on the map "03". As for this condition, the player character attacks the enemy characters 1001 in every predetermined time in accordance with the operation of the player from the input section 2. Thus, if the enemy characters 1001 suffer damage greater than a predetermined value by the repeated-attacks, then they are consequently annihilated. Because of this, the encountering probability setting value 122cd corresponding to the area point 3A is updated from "4" to "3".

Assume now that the player character 1000 is approaching the position of the area point 3A again in accordance with the operation of the player from the input section 2, after he/she has left map "03" with the area point 3A once before. Under such conditions, the encountering probability setting value 122cd corresponding to the area point 3A is "3", so that the encountering probability 122dc that the player character 1000 encounters the enemy characters 1001 is 40%. Thus, the player character 1000 has a 40% probability of encountering the enemy characters. If the player performs the above-described processing, all the enemy characters 1001 are annihilated so that the encounter setting value 122cc corresponding to the area point 3A is then updated from "3" to "2".

Figure 9D:
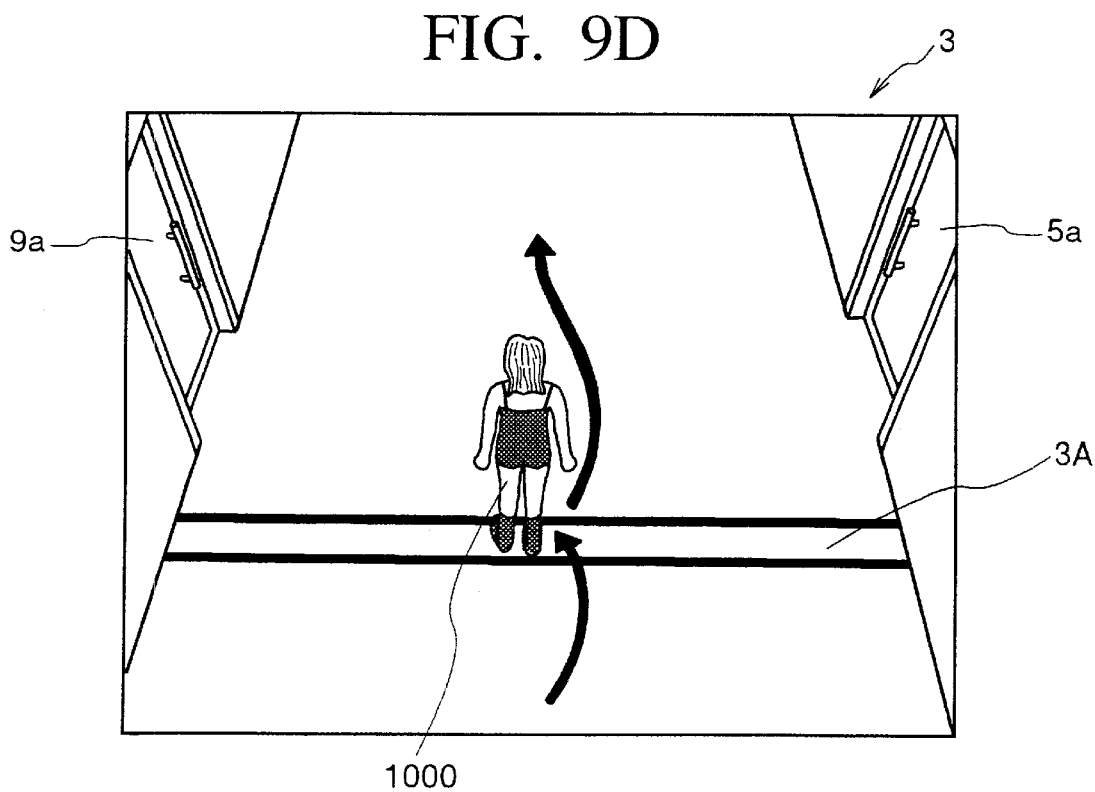

Even if the player character 1000 has reached the position of the area point 3A, he/she may not necessary encounter the enemy characters in the remaining probability of 60%. As shown in FIG. 9D, the player character 1000 can move beyond the area point 3A without encountering the enemy characters 1001.

As explained above, in the video game system employed in this embodiment, in the case where the player character reaches the area point set on the map, if the number of times the player character annihilates the enemy characters in the area point increases, the encountering probability that the player character encounters the enemy characters decreases. Accordingly, the state wherein a battle is repeatedly held between the player character and the same enemy characters in the same area can be prevented. The player character needs not repeat battles with such an enemy character that the player character may not be able to gain a successful experience level, judging from the present level of the player character, thus the game can progress smoothly.

The encountering probability that the player character encounters the enemy character is 100%, until the player character annihilates the enemy characters in the respective area points. Thus, the progress of the game according to the present invention should not be boring for the player, on the contrary, it will be even more exciting.

In the case where the player character actually encounters the enemy characters in the area point, the background of the player character is made gray and displayed. Because of this, the player can easily recognize that the operation of the player character should shift from moving on the map to battling with the enemy characters.

In the above-described embodiment, when the player character annihilates the enemy characters, that is, when it wins against the enemy characters, the encountering probability setting value is updated. However, the encountering probability setting value can be updated every time the player character encounters the enemy characters. In such a case, even if the player selects a command for running away during the battle still being held, the probability that the player character encounters the enemy character decreases.

In the above-described embodiment, when the player character steps into the area point where it may encounter the enemy characters, the player character will always encounter the enemy characters. However, the player character may encounter the enemy characters only when the encounter map table shown in FIG. 10A includes a column of prior event flag 122ce corresponding to the area point 122cc and when the prior event flag 122ce is set therein (that is, when the value is "1"). The prior event flag 122ce is to be set only when a particular event occurs (for example, when the player character obtains a particular item or so).

In the above-described embodiment, the encountering probability setting value 122cd is in one-to-one correspondence with the area point 122cc where the player character encounters the enemy character. However, as shown in the encounter map table 122c in FIG. 10B, a plurality of area points 122cc may correspond to one single encountering probability setting value 122cd. As a result, if there are areas which differ from each other in coordinates in three dimensional space but are basically the same in image to be displayed, the state in which the player character repeatedly encounters the enemy characters in the apparently same position is entirely avoidable.

In the above-described embodiment, when the player character reaches the area point, the probability that the player character actually encounters the enemy characters in the position is recognized as the encountering probability 122dc which is stored in the encountering probability setting table 122d in a manner corresponding to the encountering probability setting value 122cd for the area. However, as seen from FIG. 10C, instead of including the encountering probability setting value 122cd, a column of the number of encounters 122cf (and/or the number of winning battles) may be arranged in the encounter map table 122c so as to count the number. The CPU 11 may obtain the probability that the player character actually encounters the enemy characters, by solving a predetermined calculation using the value counted corresponding to the respective areas in the encounter table. In this calculation, the level value of the player character or the experience level thereof can be employed.

In the above-described embodiment, the case where the encountering probability that the player character, moving on the map, encounters the enemy characters varies is described. However, the present invention is applicable to the above case where the player character encounters the enemy character, but also to any other case, as long as a change is made in an occurring probability that an event (for example, executing a mini game or the like) occurs when the player character reaches a particular area on the map.

In the above-described embodiment, the present invention can be realized by employing the video game system shown in FIG. 1, as a platform. However, there are various types of apparatuses which can be employed as the platform for realizing the present invention, other than the video game system in the above-described embodiment, the apparatuses can be a general-purpose computer such as a personal computer, etc., a portable game machine, an arcade game machine or the like.

In the above-described embodiment, a CD-ROM is employed as an example of the storage medium 4. However, the storage medium in the present invention can be a magnetic disc or a magnetic tape, such as an FD (Floppy Disc), an HD (Hard Disc), a DAT (Digital Audio Tape), or even an optical disc such as a DVD (Digital Versatile Disc), or an optical magnetic disc such as an MO (Magnetic Optical Disc), or a semiconductor memory such as a ROM cartridge or a flash memory, etc.

In the above-described embodiment, the program or data for realizing the video game of the present invention can be retrieved from the removable storage medium 4 which is set to the video game apparatus 1. However, the program or data for realizing the video game of the present invention can be pre-installed in a storage device which the video game apparatus or a computer device possesses. Furthermore, the program or data for realizing the video game of the present invention can be transmitted to the video game apparatus 1, as a computer data signal which is embodied in a carrier wave and which is transmitted from an external device on the network 5 connected via the communication line 90.

In the above-described embodiment, the video game of the present invention is executed by the video game apparatus 1. However, the video game of the present invention can progress when the program is executed by a hardware resource of the external device on the network 5 connected via the communication line 90. Further, the video game can progress by performing data communications with another game machine for game or he general-purpose computer device via the network 5.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A video game apparatus comprising:
   event occurring area storage means for storing positions of a plurality of event occurring areas, on a map, in each of which a predetermined event is to occur and which are set on the map functioning as a movement area where a character moves in accordance with an externally transmitted input;
   control-variable storage means for storing a plurality of control variables each of which is to control an event occurring probability that the event will occur in each of the event occurring areas, in association with each of the plurality of event occurring areas;
   area determination means for referring to the positions of the respective event occurring areas which are stored in said event occurring area storage means, and determining whether the character has reached one of the plurality of event occurring areas;

event occurrence means for causing the event, set in one of the plurality of event occurring areas, to occur in accordance with the probability corresponding to one of the plurality of control variables which is stored in said control-variable storage means in association with the one of the plurality of event occurring areas that the character has reached, when said area determination means determines that the character has reached the one of the plurality of event occurring areas; and control-variable updating means for updating the one of the control variables which is stored in said control-variable storage means in association with the one of the plurality of event occurring areas in which the event has occurred, when said event occurrence means causes the event to occur and/or when the event is completed, the probability corresponding to each of the plurality of control variables decreases while the number of times one of the control variables is updated by said control-variable updating means is increased.

2. The video game apparatus according to claim 1, wherein even in a case where the character has reached one of the plurality of event occurring areas, when the control variable which is stored in said control-variable storage means in association with the one of the plurality of event occurring areas is not updated, said event occurrence means causes the event set in the one of the plurality of event occurring areas to occur with a 100% probability.

3. The video game apparatus according to claim 1, wherein:

said control-variable storage means stores one control variable in association with two or more event occurring areas; and said control-variable updating means updates the one control variable stored in association with the two or more event occurring areas, when the event is caused to occur in any of the two or more event occurring areas and/or when the event is completed.

4. The video game apparatus according to claim 1, wherein said event occurrence means includes means for executing a predetermined calculation, using the control variable stored in said control-variable storage means in association with the event occurring area that the character has reached and a variable representing a state of the character, and causes the event set in the event occurring area to occur in accordance with a result of the calculation.

5. The video game apparatus according to claim 1, wherein the event is a battle held between the character and an enemy character.

6. A video game apparatus comprising an input device, a storage device, a processor and a display device, wherein:

said input device performs inputting to move a character on a map;

said storage device stores an area table storing positions of a plurality of event occurring areas, on a map, in each of which a predetermined event is to occur and which are set on the map, a control-variable table storing a plurality of control variables each of which is to control an event occurring probability that the event will occur in each of the plurality of event occurring areas, in association with each of the plurality of event occurring areas; and a program comprising: a character movement step of causing the character to move on the map in accordance with an input from said input device; an area determination step of referring to the positions of the respective event occurring areas stored in said area table, and determining whether the character moved at said character movement step has reached one of the plurality of event occurring areas; an event occurrence step of causing the event, when it is determined that the character has reached the one of the plurality of event occurring areas, set in the one of the plurality of event occurring areas to occur, in accordance with the probability corresponding to one of the plurality of control variables which is stored in said control-variable table in association with the event occurring area where the character has reached; and a control-variable updating step of updating one of the plurality of control variables which is stored in said control-variable table in association with the event occurring area in which the event occurs, when the event is caused to occur at said event occurrence step and/or when the event is completed;

said processor executes the program stored in said storage device; and said display device displays an image corresponding to a movement of the character on the map where the character moves when said processor executes the character movement step of the program and an image corresponding to the event which occurs when said processor executes the event occurrence step of the program, the probability corresponding to each of the plurality of control variables decreases while the number of times one of the control variables is updated by said control-variable updating means is increased.

7. The video game apparatus according to claim 6, wherein even in a case where the character has reached one of the plurality of event occurring areas, when the control variable which is stored in said control-variable table in association with the one of the plurality of event occurring areas is not updated, said event occurrence step causes the event set in the one of the plurality of event occurring areas to occur with a 100% probability.

8. The video game apparatus according to claim 6, wherein:

said control-variable table stores one control variable in association with two or more event occurring areas; and said control-variable updating step updates the one control variable stored in association with the two or more event occurring areas, when the event is caused to occur in any of the two or more event occurring areas and/or when the event is completed.

9. The video game apparatus according to claim 6, wherein said event occurrence step includes a step of executing a predetermined calculation, using the control variable stored in said control-variable table in association with the event occurring area that the character has reached and a variable representing a state of the character, and causes the event set in the event occurring area to occur in accordance with a result of the calculation.

10. The video game apparatus according to claim 6, wherein the event is a battle held between the character anal an enemy character.

11. A method of controlling an event occurring probability, comprising:

preparing an area table storing positions of a plurality of event occurring areas, on a map, in each of which a predetermined event is to occur and which are set on the map, and preparing also a control-variable table which stores a plurality of control variables each of which is to control an event occurring probability that the event will occur in each of the plurality of event occurring areas in, association with each of the plurality of event occurring areas;

causing a character to move on the map in accordance with an externally transmitted input;

referring to the positions of the respective event occurring areas stored in said area table, and determining whether the character has reached one of the plurality of event occurring areas upon movement of the character;

causing, when it is determined that the character has reached the one of the plurality of event occurring areas, the event set in the one of the plurality of event occurring areas to occur, in accordance with the event occurring probability corresponding to one of the plurality of control variables which is stored in said control-variable table in association with the one of the event occurring areas that the character has reached; and updating the one of the control variables which is stored in said control-variable table in association with the one of the event occurring areas in which the event occurs, when the event is caused to occur and/or when the event is completed, the probability corresponding to each of the plurality of control variables decreases while the number of times one of the control variables is updated by said control-variable updating means is increased.

12. The method of controlling an event occurring probability according to claim 11, wherein even in a case where the character has reached one of the plurality of event occurring areas, when the control variable which is stored in said control-variable table in association with the one of the plurality of event occurring areas is not updated, the event set in the one of the plurality of event occurring areas is occurred with a 100% probability.

13. The method of controlling an event occurring probability according to claim 11, wherein:

said control-variable storage table one control variable in association with two or more event occurring areas; and the one control variable stored in association with the two or more event occurring areas is updated, when the event is caused to occur in any of the two or more event occurring areas and/or when the event is completed.

14. The method of controlling an event occurring probability according to claim 11, wherein the step of causing the event to occur includes a step of executing a predetermined calculation, using the control variable stored in said control-variable table in association with the event occurring area that the character has reached and a variable representing a state of the character, and causes the event set in the event occurring area to occur in accordance with a result of the calculation.

15. The method of controlling an event occurring probability according to claim 11, wherein the event is a battle held between the character and an enemy character.

16. A computer readable storage medium storing a program executed by a computer, said program comprising:

a table preparation step of preparing, in a storage device an area table storing positions of a plurality of event occurring areas, on a map, in each of which a predetermined event is to occur and which are set on the map in association with each other, and a control-variable table storing a plurality of control variables each of which is to control an event occurring probability of the event in each of the event occurring areas, in association with each of the plurality of event occurring areas;

a character movement step of causing the character to move on the map in accordance with an externally transmitted input;

an area determination step of referring to the positions of the respective event occurring areas stored in said area table, and determining whether the character caused to move at said character movement step has reached one of the plurality of event occurring areas;

an event occurrence step of causing, when it is determined that the character has reached the one of the plurality of event occurring areas at said area determination step, the event to occur in the one of the plurality of event occurring areas, in accordance with the event occurring probability corresponding to one of the plurality of control variables which is stored in said control-variable table in association with the event occurring area that the character has reached; and a control-variable updating step of updating the one of the control variables which is stored in said control-variable table in association with the event occurring area in which the event occurs, when the event is caused to occur at said event occurrence step and/or when the event is completed, the probability corresponding to each of the plurality of control variables decreases while the number of times one of the control variables is updated by said control-variable updating means is increased.

17. A program signal embedded in a carrier wave, said program signal comprising:

a table preparation segment for preparing, in a storage device, an area table for storing positions of a plurality of event occurring areas, on a map, in each of which a predetermined event is to occur and which are set on the map, and a control-variable table storing a plurality of control variables each of which is to control an event occurring probability that the event in each event occurring area will occur;

a character movement segment for causing the character to move on the map in accordance with an externally transmitted input;

an area determination segment for referring to the positions of the respective event occurring areas stored in said area table, and determining whether the character caused to move by said character movement segment has reached one of the plurality of event occurring areas;

an event occurrence segment for causing, when it is determined that the character has reached the one of the plurality of event occurring areas by said area determination segment, the event set in the event occurring area to occur, in accordance with the event occurring probability corresponding to one of the plurality of control variables which is stored in said control-variable table in association with the event occurring area that the character has reached; and a control-variable updating segment for updating the one of the control variables which is stored in said control-variable table in association with the event occurring area that the character has reached, when the event is caused to occur by said event occurrence segment and/or when the event is completed, the probability corresponding to each of the plurality of control variables decreases while the number of times one of the control variables is updated by said control-variable updating means is increased.

\* \* \* \* \*